March 4, 1941.  E. L. FIX  2,233,941
NONGLARE SAFETY GLASS
Filed June 23, 1936
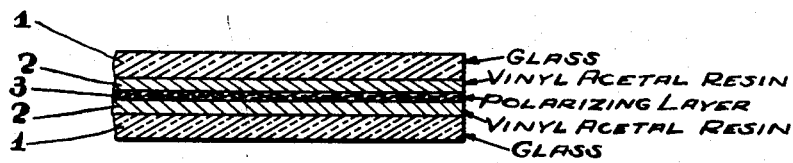
INVENTOR.
EARL L. FIX
BY Bradley & Bee
ATTORNEYS.

Patented Mar. 4, 1941

2,233,941

UNITED STATES PATENT OFFICE 2,233,941

NONGLARE SAFETY GLASS

Earl L. Fix, New Kensington, Pa., assignor to Pittsburgh Plate Glass Company, a corporation of Pennsylvania Application June 23, 1936, Serial No. 86,795

5 Claims. (Cl. 88—65)

The invention relates to nonglare safety glass for use in automobile shields, headlight glasses, goggles and the like of the type involving the use of a light polarizing medium positioned as one of the layers of the laminated plate. This medium is ordinarily in the form of a thin sheet of cellulose plastic (either acetate or nitrate or a mixture of the two) carrying crystals of herapathite or its equivalent dispersed through the plastic with their polarizing axes oriented to substantial parallelism. It has been proposed heretofore to laminate the polarizing sheet or layer in a five layer plate consisting of two outer sheets of glass, a sheet of cellulose nitrate or cellulose acetate cemented to the inner face of each sheet of glass and the polarizing sheet between the cellulose sheets and cemented thereto, the lamination being accomplished in the usual way by the application of heat and pressure to the assembled layers. This gives a safety glass having the desired polarizing characteristics, but one which is unsatisfactory as a commercial product. There is a tendency toward edge separation between the sheets of reinforcing and the polarizing layer and a substantial degree of depolarizing occurs due to the displacement of the crystals in the polarizing layer when the sandwich is subjected to the degree of heat and pressure necessary to secure a proper lamination.

I have found that the foregoing objections are entirely overcome by the use of vinyl acetal resin reinforcing sheets in lieu of the cellulose plastic sheets, and that the laminating operation is much simplified and improved. No cement is required to adhere the resin sheets to the glass or to the polarizing layer, a very secure bond being attained by the mere application of heat and pressure of a degree common in all laminating operations. Further, the difficulty as to edge separation is entirely avoided and there is no appreciable depolarization incident to the pressing operation, the latter advantage being due, I believe, to the fact that the plasticizers employed in the resin do not affect the plastic carrying the polarizing crystals and to the fact that the resin when plasticized, so as to give it a maximum degree of strength for safety glass purposes, is much softer than the cellulose plastic sheets heretofore used in a polarizing safety glass. A plate of the improved product is illustrated in the accompanying drawing, wherein:

The figure is a partial section through the plate, the thickness of the layers being much exaggerated for clearness of illustration.

Referring to the drawing, 1, 1 are glass sheets; 2, 2 are sheets or layers of plasticized vinyl acetal resin; and 3 is a sheet or layer of plastic carrying the polarizing particles such as herapathite crystals.

The resin preferably employed as the composition of the sheets 2, 2 is a polymerized incomplete poly-vinyl acetal, such as that described in my application, Serial No. 65,599, filed February 25, 1936, now Patent No. 2,045,130, but other of the vinal acetal resin compositions may be employed. The resin is preferably plasticized with a glycol dihexoate as set forth in such application in an amount equal to about 30 per cent of the mix, or by one of the phthalates, such as diethyl phthalate in an amount equal to about 37 per cent of the mix. This gives a relatively soft interlayer of maximum strength under a wide temperature range and one in which the plasticizer will not adversely affect the orientation of the polarizing particles in the sheet 3 as later described. These factors contribute to maintain the polarizing layer from deterioration when the sandwich is subject to heat and pressure in laminating.

The polarizing layer is preferably in the form of a pre-fabricated sheet well known in the art, and consisting of a body of cellulose acetate or cellulose nitrate with herapathite crystals dispersed therethrough with their axes in substantial parallelism. Such a layer is described in the patent to E. H. Land No. 2,031,045 dated February 18, 1936. In that case, the plastic suspending medium consists of nitrocellulose and an acetate non-solvent of herapathite, but the invention is not limited to this particular medium as the polarizing particles may be suspended and oriented in other cellulose plastic compositions, such as cellulose nitrate alone or cellulose acetate alone, or in a layer of a vinyl acetal resin or other plastic of a type which is not readily subject to the absorption of the plasticizer used in the reinforcing sheets 2, 2.

The sandwich consisting of the five layers, as heretofore described, is composited preferably in an autoclave under heat and pressure in a manner well known in the art, the pressure employed being preferably about 150 pounds per square inch and the temperature about 240 degrees F.

What I claim is:

1. A laminated plate of nonglare safety glass comprising a pair of glass sheets, a layer of plasticized, polymerized incomplete vinyl acetal resin adherent to the inner face of each glass sheet, and a relatively thin sheet of hard cellulosic material intermediate the vinyl acetal resin layers and adhered thereto, the cellulosic material having dispersed and embedded therein a multiplicity of light polarizing particles with their polarizing axes oriented to substantial parallelism.

2. A laminated plate of nonglare safety glass comprising a pair of glass sheets, a layer of relatively soft, polymerized incomplete vinyl acetal resin plasticized with a glycol dihexoate adherent to the inner face of each glass sheet, and a relatively thin sheet of cellulose acetate intermediate the vinyl acetal resin layers and adhered thereto, the cellulose acetate layer having dispersed and embedded therein a multiplicity of herapathite crystals with their polarizing axes oriented to substantial parallelism.

3. A laminated plate of nonglare safety glass comprising a pair of glass sheets, a layer of relatively soft polymerized incomplete vinyl acetal resin plasticized with diethyl phthalate adherent to the inner face of each glass sheet, and a relatively thin sheet of cellulose acetate intermediate the vinyl acetal resin layers and adhered thereto, the cellulose acetate layer having dispersed and embedded therein a multiplicity of herapathite crystals with their polarizing axes oriented to substantial parallelism.

4. A method of preparing laminated nonglare safety glass which comprises interposing a sheet of flexible, transparent plastic material having dispersed and embedded therein a multiplicity of light polarizing particles with their polarizing axes oriented to substantial parallelism between two preformed sheets of plasticized vinyl acetal resin, placing the sheets between two plates of glass and then causing the assembly to adhere together without depolarizing the central sheet by controlled application of heat and pressure.

5. A method of preparing laminated nonglare safety glass which comprises interposing a sheet of flexible, transparent cellulosic material having dispersed and embedded therein a multiplicity of hereapathite crystals with their polarizing axes oriented to substantial parallelism between two preformed sheets of a plasticized, polymerized incomplete vinyl acetal resin, placing the sheets between two plates of glass and then causing the assembly to adhere as a composite unit without depolarizing the central sheet by subjecting it to a pressure of approximately 150 pounds per square inch at a temperature of about 240 degrees F.

EARL L. FIX.